(12) United States Patent
Gioscia et al.

(10) Patent No.: US 6,577,496 B1
(45) Date of Patent: Jun. 10, 2003

(54) NON-RIGID MOUNTING OF A FOLDABLE DISPLAY

(75) Inventors: Rich Gioscia, Santa Clara, CA (US); Lawrence Lam, San Jose, CA (US); Udagawa Masamichi, Tokyo (JP)

(73) Assignee: Palm, Inc., Santa Clara, CA (US)

(*) Notice: Subject to any disclaimer, the term of this patent is extended or adjusted under 35 U.S.C. 154(b) by 47 days.

(21) Appl. No.: 09/766,176

(22) Filed: Jan. 18, 2001

(51) Int. Cl.[7] .................................. G02F 1/1333
(52) U.S. Cl. ................ 361/681; 361/683; 345/156; 379/433; 455/344
(58) Field of Search ................ 361/681, 683, 361/682, 686, 687; 345/156, 158, 159, 121, 168, 169, 173, 901, 905, 32, 85, 58; 348/734, 818; 359/742, 474, 472, 477, 230; 340/825.79, 825.71; 364/186, 189, 708.1, 709.1, 709.11–709.16; 455/344, 556, 566, 557, 550, 553, 572, 574, 575, 347, 351, 158.4, 90, 128; 379/433, 434, 438, 447, 428, 440

(56) References Cited

U.S. PATENT DOCUMENTS

| | | | | |
|---|---|---|---|---|
| 3,662,807 A | * | 5/1972 | Miller | 160/135 |
| 3,748,971 A | * | 7/1973 | Grundell | 93/1 E |
| 5,049,862 A | * | 9/1991 | Dao et al. | 340/706 |
| 5,189,632 A | * | 2/1993 | Paajanen et al. | 364/705.05 |
| 5,467,102 A | * | 11/1995 | Kuno et al. | 345/1 |
| 5,534,888 A | * | 7/1996 | Lebby et al. | 345/121 |
| 5,646,649 A | * | 7/1997 | Iwata et al. | 345/173 |
| 5,734,513 A | * | 3/1998 | Wang et al. | 359/742 |
| 5,768,812 A | * | 6/1998 | Cross | 40/120 |
| 5,896,575 A | * | 4/1999 | Higginbotham et al. | 455/344 |
| 6,047,196 A | * | 4/2000 | Makela et al. | 455/556 |
| 6,057,814 A | * | 5/2000 | Kalt | 345/58 |
| 6,107,988 A | * | 8/2000 | Phillipps | 345/156 |
| 6,259,932 B1 | * | 7/2001 | Constein | 455/556 |
| 6,297,945 B1 | * | 10/2001 | Yamamoto | 361/681 |
| 6,317,108 B1 | * | 11/2001 | Kalt | 345/85 |
| 6,331,840 B1 | * | 12/2001 | Nielson et al. | 345/1.1 |
| 6,356,443 B2 | * | 3/2002 | Jenks et al. | 361/686 |
| 6,377,324 B1 | * | 4/2002 | Katsura | 349/58 |

FOREIGN PATENT DOCUMENTS

| | | | | |
|---|---|---|---|---|
| JP | 407181462 A | * | 7/1995 | G02F/1/1333 |
| JP | 410207389 A | * | 8/1998 | G06F/9/00 |
| JP | 410319879 A | * | 12/1998 | G09F/9/40 |
| JP | 411073262 A | * | 3/1999 | G06F/3/023 |
| JP | 02001051251 A | * | 2/2001 | G02F/1/133 |

* cited by examiner

Primary Examiner—Darren Schuberg
Assistant Examiner—Michael Datskovsky
(74) Attorney, Agent, or Firm—Wagner, Murabito & Hao LLP

(57) ABSTRACT

A foldable display device coupled to a non-rigid support mechanism movable between an unfolded and a folded position. In one embodiment, the e-ink display device is dual sided and both sides can display information as well as accept touch screen commands. One side of the display device is used in the unfolded position and the opposite side is used in the folded position. In the unfolded position, the display device has a Personal Digital Assistant (PDA) form factor, and the entire area of one side of the display device is viewable. The display device is supported within the non-rigid support mechanism such that it lies in a flat plane in the unfolded position, and there is no loss of viewable area due to folding of the display device. The two sides of the non-rigid support mechanism are coupled for movement between a folded and an unfolded position and the display device is folded in a bend radius that precludes any disruption to the display area. Moving the support mechanism from the unfolded position to the folded position folds the display device about an axis that divides the display device into two equal rectangles. In the folded position, the display device has a candy bar form factor useful in cell phone applications, and the viewable area is about one half that of the PDA form factor used in the unfolded position. The non-rigid support mechanism holds the viewable area of the display device in a flat plane in the folded position.

24 Claims, 6 Drawing Sheets

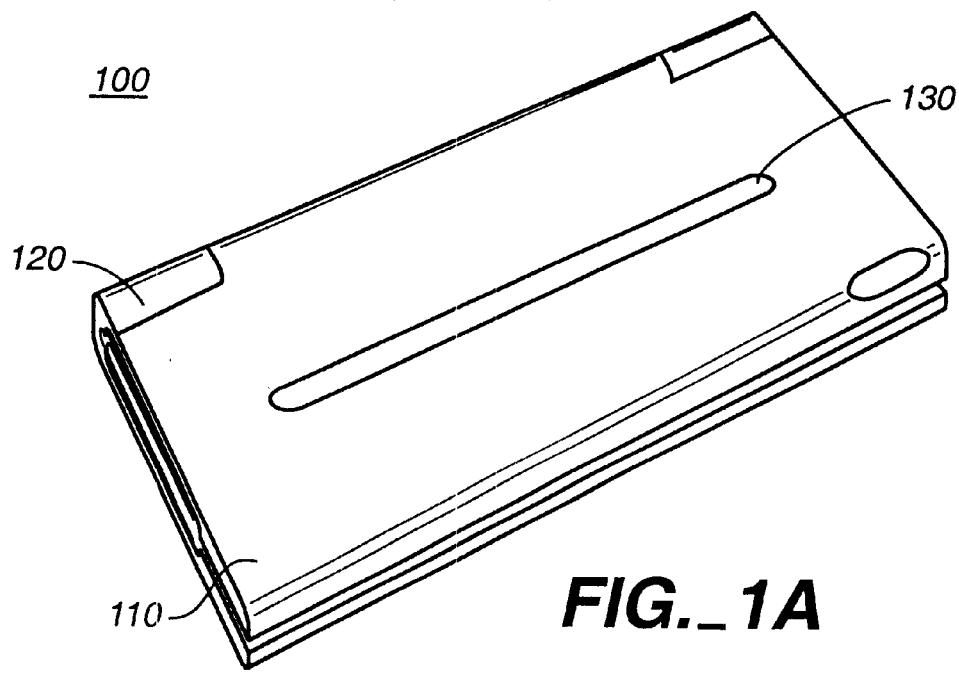
FIG._1A
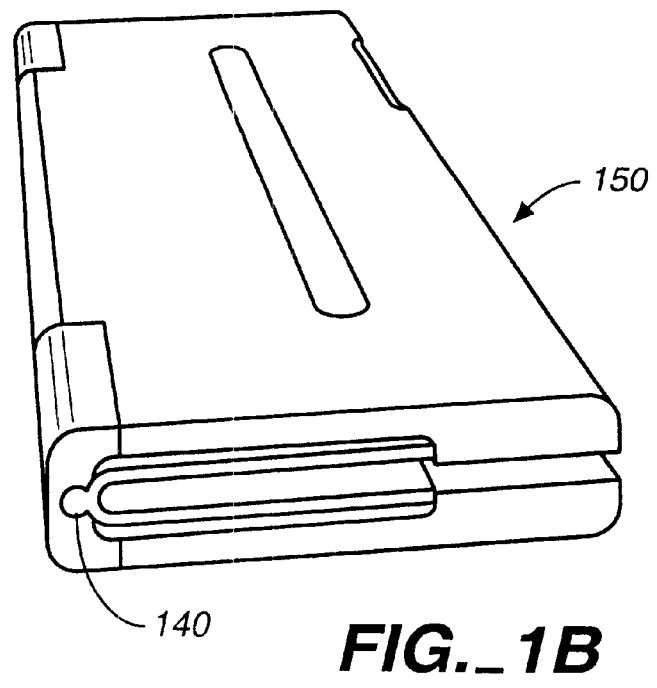
FIG._1B

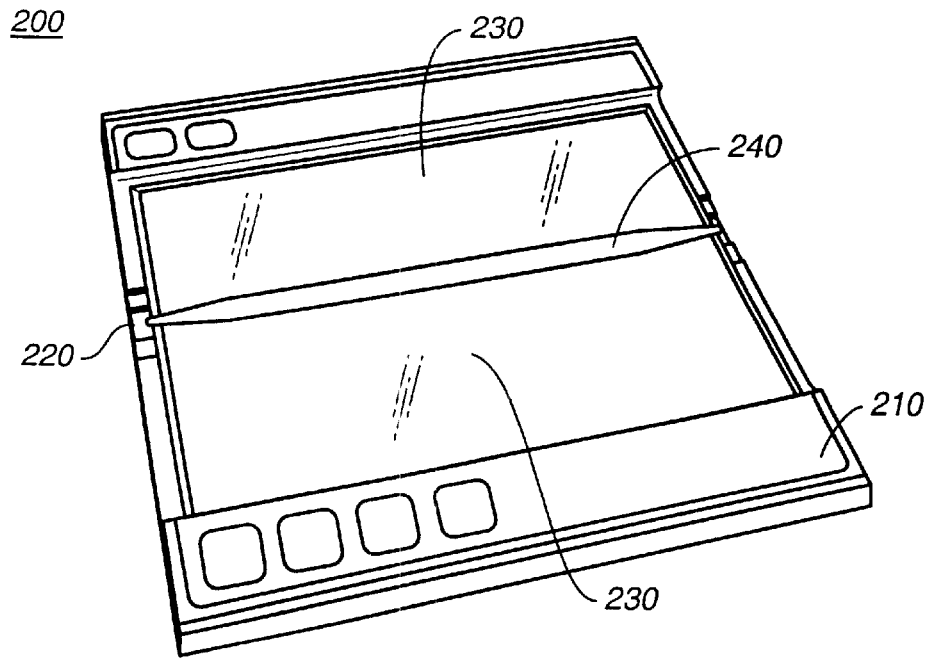
FIG._2A
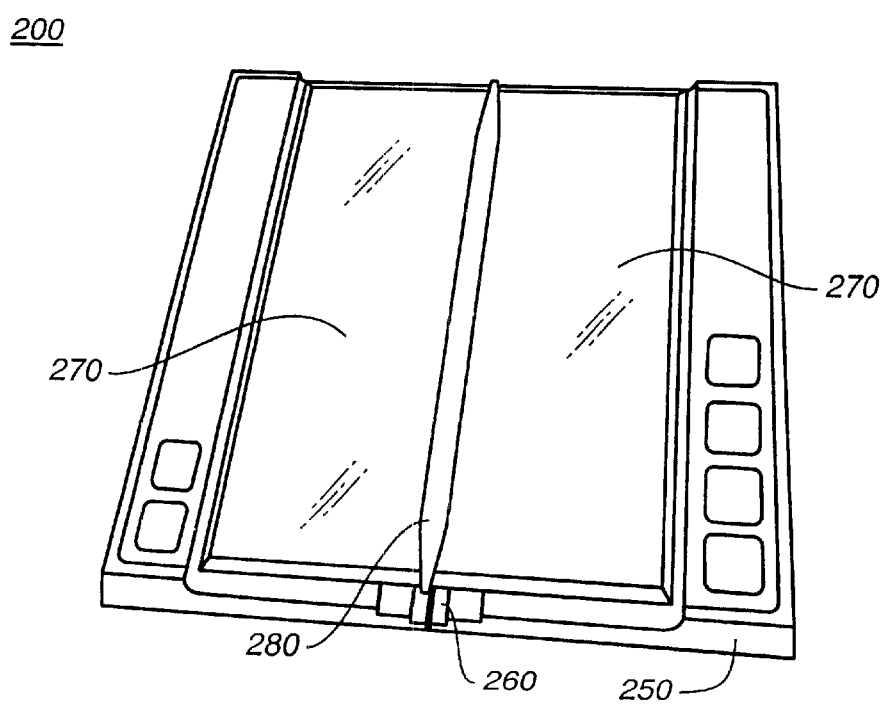
FIG._2B

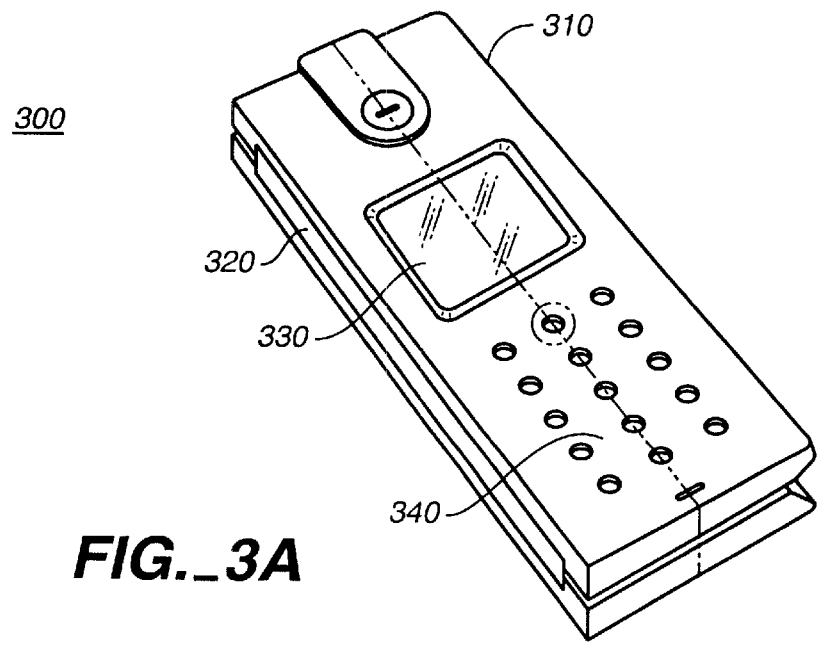
FIG._3A
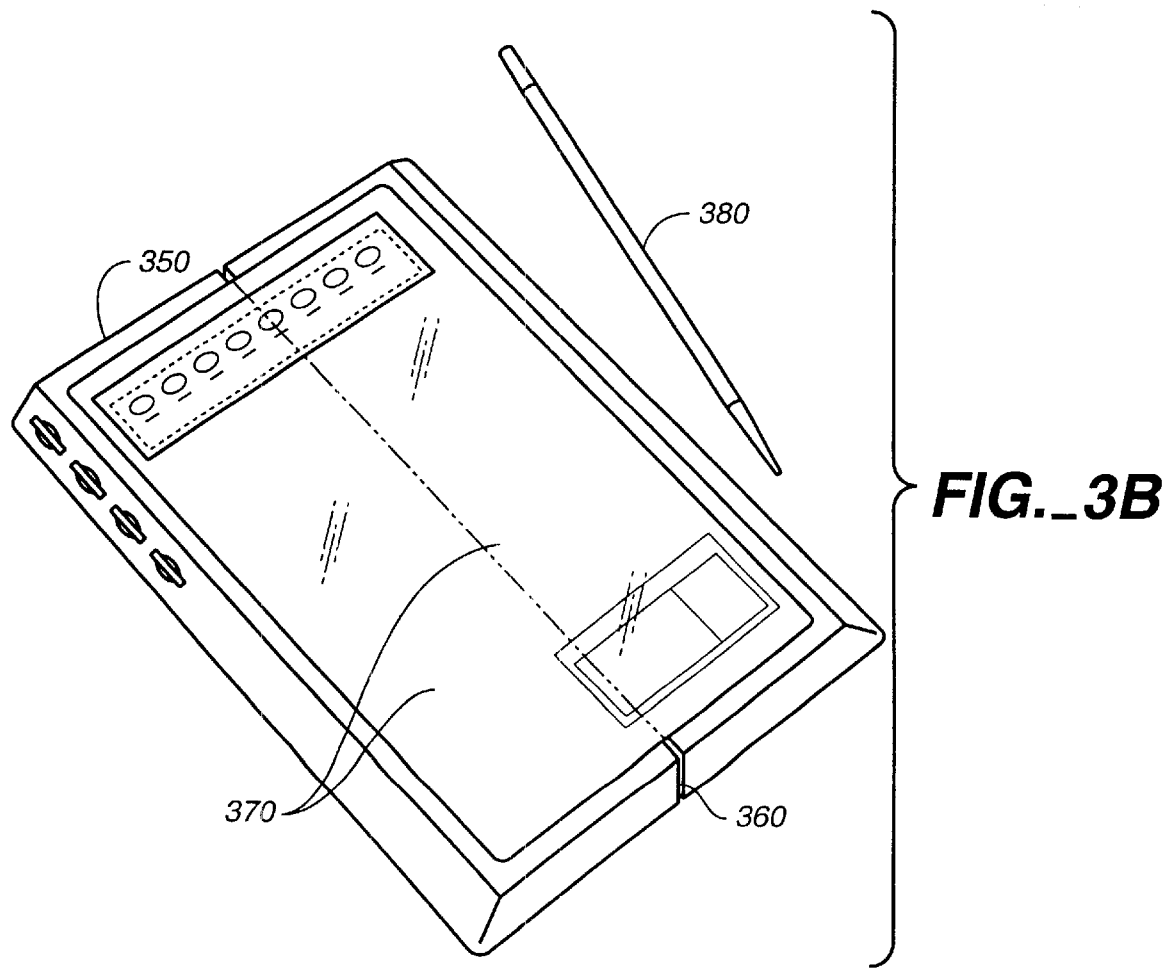
FIG._3B

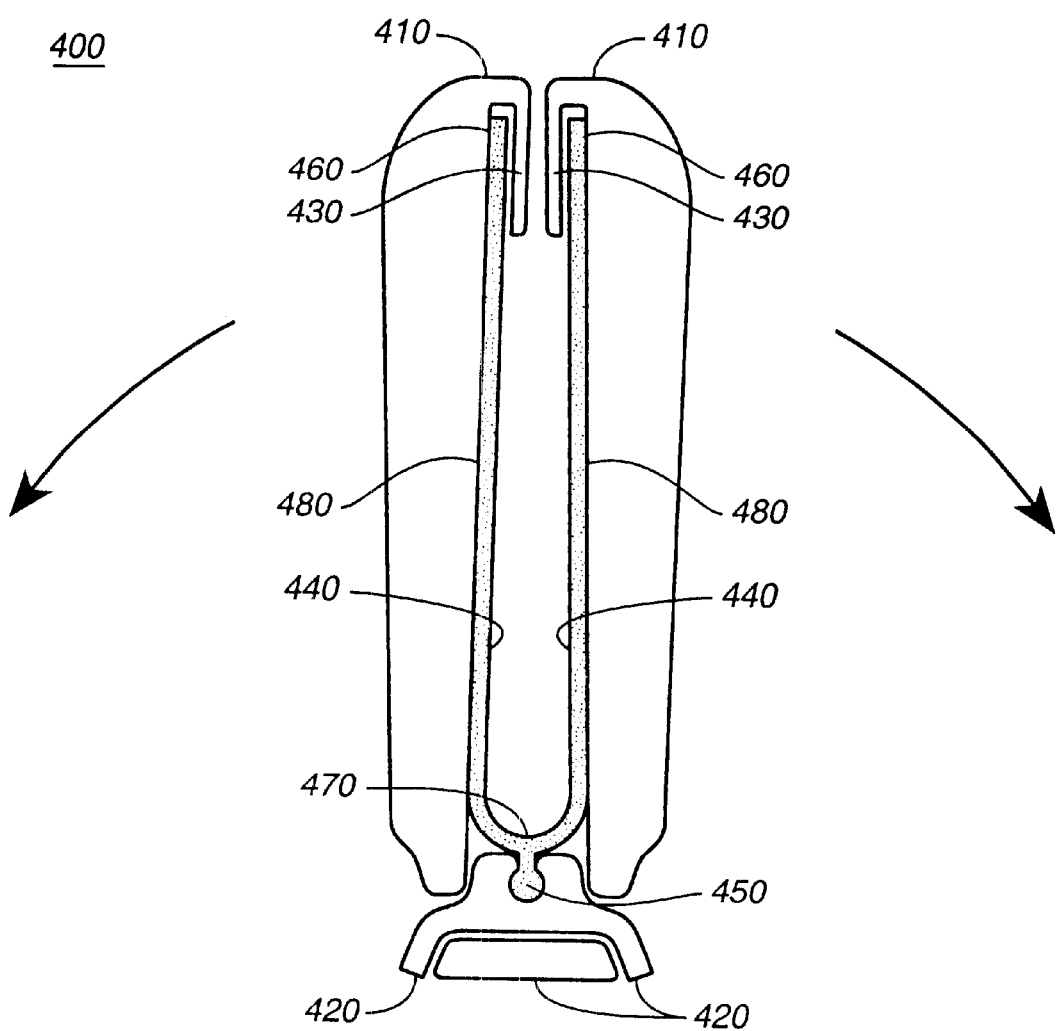
FIG._4

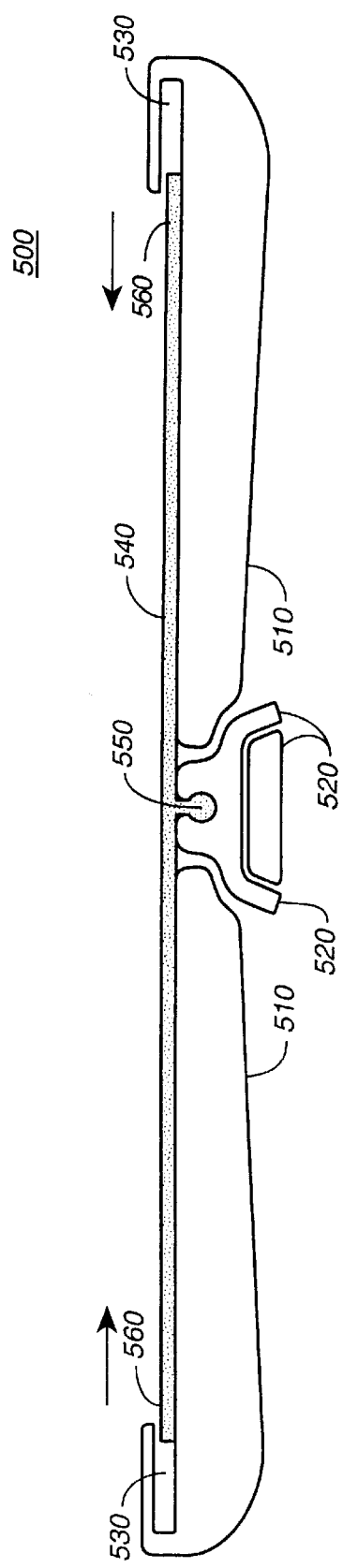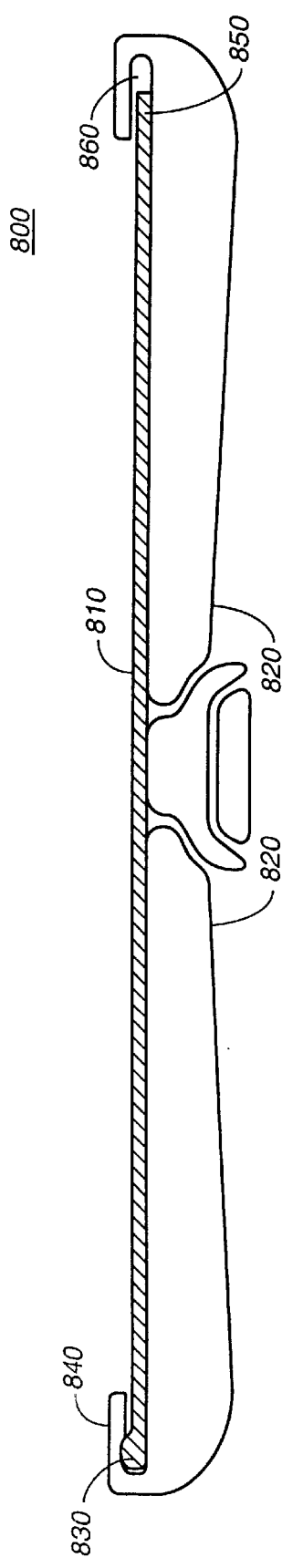

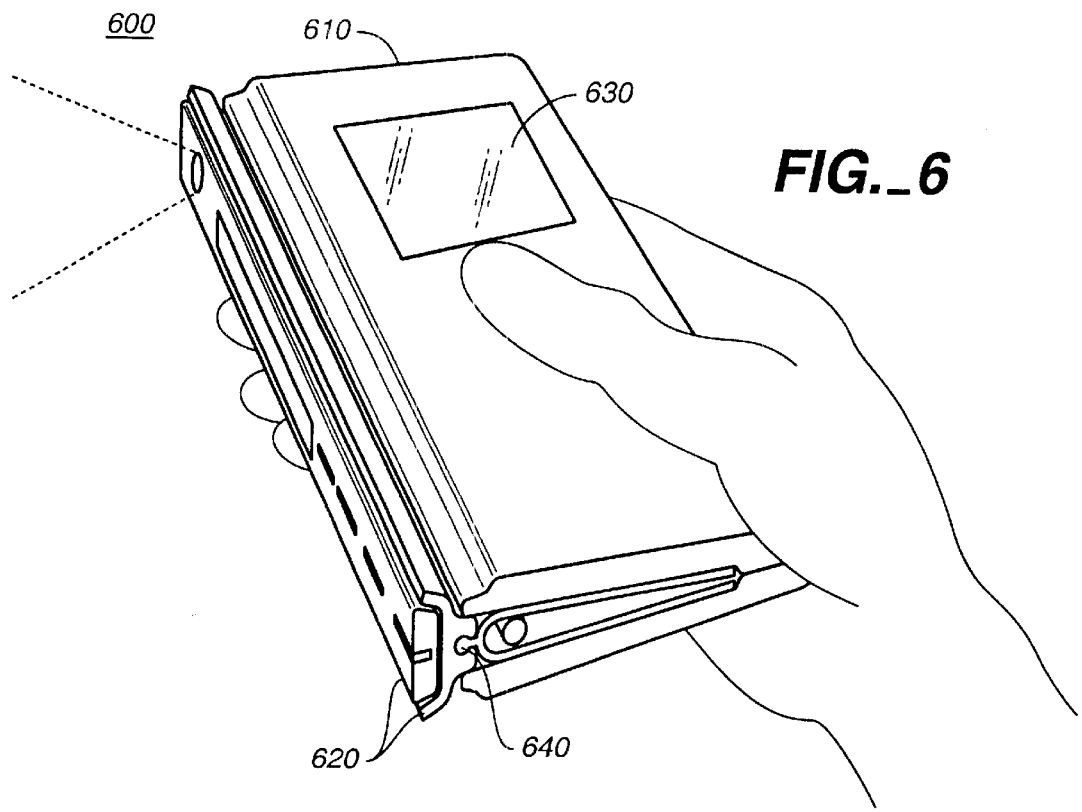
FIG._6
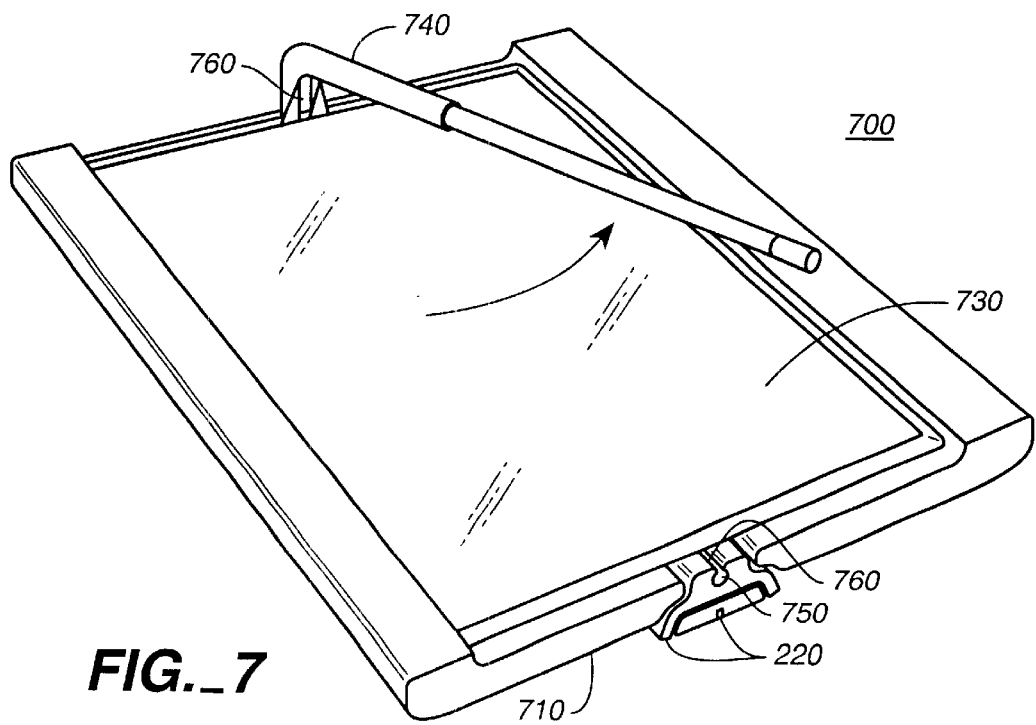
FIG._7

NON-RIGID MOUNTING OF A FOLDABLE DISPLAY

BACKGROUND OF THE INVENTION

1. Field of the Invention

The present invention relates to the field of portable electronic devices that contain display devices. More particularly, the present invention relates to flexible display devices than can be folded and that can display information on both sides.

2. Related Art

Digital display devices are found in numerous electronic products such as wrist watches, hand calculators, cell phones and Personal Digital Assistants (PDA). Flat panel displays are included in certain applications both to present information to the user as well as to accept input data by means of user touch screen commands. Such displays can be used to present information as well as to accept touch screen commands from a digitizer located on the display.

Digital displays of various dimensions are available to accommodate a multitude of different applications according to the required viewing area. The viewing area for a wrist watch display would likely be too small for either a cell phone or a PDA. Likewise, the viewing area desired for a PDA would probably be too large for the form factor of either a wrist watch or a cell phone. Furthermore, a dual sided display might be called for in the case of a PDA, whereas a wrist watch would probably not require a dual sided display.

In some instances, it would be advantageous to incorporate at least two different applications in a single unit with a single display screen. For example, a digital clock function might be included in a digital calculator having a single digital display. On the other hand, including a calculator function in a digital wrist watch might require a slightly larger single digital display. Similarly, a cell phone function could be incorporated with a PDA function in a single unit having a single digital display. Clearly this would be a very desirable combination.

The problem created here is related to the viewable area of the display screen. The physical dimensions of a typical cell phone, described as the candy bar form factor, are considerably smaller than the physical dimensions of a PDA, described as the PDA form factor. In order to make use of a single display, the larger PDA form factor must be used. Using a device having the dimensions of a PDA as a cell phone would be both cumbersome and awkward.

One attempt to resolve this problem has been the use of a single, dual sided digital display having the candy bar form factor of a cell phone. Using the entire area of one side of the display for the PDA function, the width of the display area is a number of times greater than the height of the display area. A reduced portion of the reverse side of the display is then used for the cell phone function. One difficulty of this design is that the PDA display area is restricted to the physical dimensions of the cell phone.

In an effort to increase the display area of the PDA function, the use of two separate but equal area digital displays placed side by side in a foldable support mechanism has recently been proposed. In the unfolded position, the two separate side by side displays have a PDA form factor. In the folded position, the two separate displays are back to back and have a candy bar form factor that is about one half the PDA form factor. The problem here is the segmented appearance or page like separation of the side by side displays in the unfolded position. Furthermore, the cost and complexity of using two digital display units is prohibitive.

SUMMARY OF THE INVENTION

Accordingly, the present invention provides a mechanism for coupling a foldable, dual sided display device to a non-rigid support mechanism that will allow folding of the display device without any loss of useable area due to the folding operation. More specifically, the non-rigid support mechanism is used to provide a bend radius during folding of the display device such that a page like separation along the fold axis of the display device is eliminated. Further, the non-rigid support mechanism holds the usable area of the display device in a flat plane in both the folded and the unfolded positions. In the unfolded position, the display device has a Personal Digital Assistant (PDA) form factor. In the folded position, the display device has a candy bar form factor which is about one half the PDA form factor which is useful in cell phone applications. The display device can be double sided and one side of the display device is used in the folded position and the other side of the display device is used in the unfolded position. It is appreciated that in one embodiment both sides of the display device can be used to present information as well as to accept touch screen commands.

A foldable display device coupled to a non-rigid support mechanism movable between an unfolded and a folded position is described. The e-ink display device is dual sided and both sides can display information as well as accept touch screen commands in one embodiment. One side of the display device is used in the unfolded position and the opposite side is used in the folded position. In the unfolded position, the display device has a Personal Digital Assistant (PDA) form factor, and the entire area of one side of the display device is viewable.

The display device is supported within the non-rigid support mechanism such that it lies in a flat plane in the unfolded position, and there is no loss of viewable area due to folding of the display device. The two sides of the non-rigid support mechanism are coupled for movement between a folded and an unfolded position and the display device is folded in a bend radius that precludes any disruption to the display area. Moving the support mechanism from the unfolded position to the folded position folds the display device about an axis that divides the display device into two equal rectangles. In the folded position, the display device has a candy bar form factor useful in cell phone applications, and the viewable area is about one half that of the PDA form factor used in the unfolded position. The non-rigid support mechanism holds the viewable area of the display device in a flat plane in the folded position.

More specifically, an embodiment of the present invention includes a non-rigid support structure having a hinge mechanism that allows folding the structure between an unfolded position and a folded position. A dual sided, flexible display device is coupled to the support mechanism such that the display device is fully functional in both the folded and the unfolded positions. Coupling of the display device to the support mechanism is such that the display device is folded along an axis that divides the display device into two equal area rectangles. The hinge mechanism is designed to fold the display device with a bend radius along the fold that eliminates any crease, fold or bend of the display device. The support structure is designed to hold the viewable area of the display device in a flat plane in both the folded and the unfolded positions. In the folded position, the display device will have a candy bar form factor useful in cell phone applications, which is about one half the Personal Digital Assistant (PDA) form factor in the unfolded position.

A second embodiment of the present invention provides a mechanism for coupling a dual sided, flexible display device and a hinged support mechanism such that moving the hinged support mechanism from an unfolded position to a folded position will result in folding the flexible display in half. The flexible display is coupled along the length of the hinge mechanism. The hinge mechanism is designed such that the bend radius of the display device is great enough to prevent any crease, fold or bend of the viewing area of the display device. In the folded position, the display device will have a candy bar form factor useful in cell phone applications, which is about one half the Personal Digital Assistant (PDA) form factor in the unfolded position.

A third embodiment of the present invention provides a mechanism for coupling a dual sided, flexible display device and a non-rigid support structure having a folded position and an unfolded position wherein the viewable area of the flexible display in the unfolded position is about twice the viewable area in the folded position. The non-rigid support structure utilizes a flexible folding structure rather than a hinge to provide the means for moving the non-rigid support structure between the folded and the unfolded positions. The flexible folding structure provides the means for folding the flexible display with a bend radius that eliminates any crease, fold or bend of the entire viewable area of the flexible display. In the folded position, the display device will have a candy bar form factor useful in cell phone applications, which is about one half the Personal Digital Assistant (PDA) form factor in the unfolded position.

BRIEF DESCRIPTION OF THE DRAWINGS

FIG. 1A is a first view of an embodiment showing the candy bar form factor used in a cell phone application with the non-rigid support structure in the folded position according to the present invention.

FIG. 1B is a second view of an embodiment showing the non-rigid support structure placed in the folded position by means of a dual hinge mechanism according to the present invention.

FIG. 2A is a first view of an embodiment showing the Personal Digital Assistant (PDA) form factor used in PDA applications with the non-rigid support structure in the unfolded position according to the present invention.

FIG. 2B is a second view of an embodiment showing the non-rigid support structure placed in the unfolded position by means of a dual hinge mechanism according to the present invention.

FIG. 3A illustrates the candy bar form factor used in a cell phone application with the non-rigid support structure placed in the folded position by means of a flexible folding structure according to the present invention.

FIG. 3B illustrates the Personal Digital Assistant (PDA) form factor used in a PDA application with the non-rigid support structure placed in the unfolded position by means of a flexible folding structure according to the present invention.

FIG. 4 illustrates a double hinge mechanism used to fold the display device with a suitable bend radius and to provide support for the display device when the non-rigid support mechanism is placed in the folded position according to the present invention.

FIG. 5 illustrates a double hinge mechanism and display device support with the display device in the unfolded position according to the present invention.

FIG. 6 illustrates how the double hinge mechanism provides a candy bar form factor in a cell phone application with the flexible display device in the folded position according to the present invention.

FIG. 7 illustrates how the double hinge mechanism provides a PDA form factor in a PDA application with the flexible display device in the unfolded position according to the present invention.

FIG. 8 shows the display device in the unfolded position and illustrates a coupling mechanism between the display device and the display device support along one edge of the display device according to the present invention.

DETAILED DESCRIPTION OF THE INVENTION

In the following detailed description of the present invention, a non-rigid mounting of a foldable display, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

FIG. 1A is a first view of an embodiment 100 showing the candy bar form factor which may be used in a cell phone application. Embodiment 100 contains a non-rigid support structure 110 which supports a flexible display screen. The two sides of the non-rigid support structure are equal area rectangles coupled together by a dual hinge mechanism 120. The non-rigid support structure is shown in the folded position. In this folded position, the display screen is contained within the support structure in a folded position. One side of the double sided display screen is viewable through an opening 130 in the support structure. This first view illustrates the opening edges of the support structure.

FIG. 1B is a second view of an embodiment 100 showing the non-rigid support structure 150 placed in the folded position by means of a dual hinge mechanism 140. This second view provides a clear view of the hinge mechanism.

FIG. 2A is a first view of an embodiment 200 showing the Personal Digital Assistant (PDA) form factor used in PDA applications with the non-rigid support structure 210 in the unfolded position. The dual hinge mechanism 220 provides the means for moving the two sides of the non-rigid support mechanism to the unfolded position. The display screen 230 is a single screen mechanism that has no seams or creases and is dual sided. In the unfolded position, the entire area of one side of the dual sided display screen 230 is viewable for PDA applications. A portion of the opposite side of the screen is viewable in the folded position for cell phone applications. This dual sided flexible screen my be implemented using e-ink technology. A removable stylus 240 for actuating touch screen functions can be held in place along the center line of the display screen 230 for storage of the stylus. Storing the stylus in this position may be an aid to holding the screen in place with a suitable bend radius when the support structure is moved to the folded position.

FIG. 2B is a second view of an embodiment 200 showing the non-rigid support structure 250 placed in the unfolded position using a dual hinge mechanism 260. The entire area of the flexible display screen 270 is viewable for PDA applications. A removable stylus 280 for actuating touch screen functions is placed along the center line of the display screen.

FIG. 3A illustrates the candy bar form factor used in a cell phone application 300 with the non-rigid support structure 310 placed in the folded position by using a flexible folding structure 320. A window 330 opening to one side of the enclosed flexible display screen for viewing cell phone functions and affecting touch screen commands is provided. The display screen is a single screen mechanism that has no seams or creases and is dual sided. A portion of the screen is viewable through the window opening 330 in the foldable position for cell phone applications. In the unfolded position, the entire area of the opposite side of the dual sided display screen is viewable for PDA applications. A keypad 340 for cell phone operation is also provided.

FIG. 3B illustrates the Personal Digital Assistant (PDA) form factor used in a PDA application 300 with the non-rigid support structure 350 placed in the unfolded position using a flexible folding structure 360. The entire viewable area of the flexible display screen 370 is now available for PDA functions. The display screen is a single screen mechanism that has no seams or creases and is dual sided. A stylus 380 for affecting touch screen commands is shown at one side.

FIG. 4 is an end view 400 that illustrates the non-rigid support mechanism in the folded position. The two sides of the support mechanism 410 are coupled using a double hinge mechanism 420. The double hinge mechanism 420 is used to fold a flexible display device 440 with a suitable bend radius 470 such that there are no creases or folds in the display device. The flexible display device is a single screen mechanism that has no seams or creases and is dual sided. The support mechanism provides support for the display device when the non-rigid support mechanism 410 is placed in the folded position. An attachment mechanism is used to couple the flexible display to the hinge mechanism 450 along a center line axis extending the full length of the display device and dividing the display device into two equal area rectangles. The two edges of the flexible display device 460 furthest from and parallel to the center line axis are held in place by two slots 430 in the non-rigid support structure. The flexible display device is free to slide within the two slots such that the viewable areas of the display device are held in a flat plane in both the folded and the unfolded positions. In this folded position, the side of the flexible display exterior to the direction of the fold 480 is viewable for cell phone functions through a window opening in the non-rigid support structure.

FIG. 5 is an end view 500 that illustrates the non-rigid support mechanism in the unfolded position. A double hinge mechanism 520 is used to couple the two sides 510 of the non-rigid support mechanism. The double hinge mechanism is used to hold a flexible display device 540 in the unfolded position. The flexible display device is a single screen mechanism that has no seams or creases and is dual sided. An attachment mechanism is used to couple the flexible display to the hinge mechanism 550 along a center line axis extending the full length of the display device and dividing the display device into two equal area rectangles. The two edges of the flexible display device 560 furthest from and parallel to the center line axis are held in place by two slots 530 in the non-rigid support structure. The flexible display device is free to move within the two slots such that the viewable area of the display device is held in a flat plane in both the folded and unfolded positions. In this unfolded position, the entire viewable area of one side of the flexible display screen is now available for PDA functions.

FIG. 6 illustrates how the non-rigid support mechanism is used for cell phone applications in the folded position 600. The double hinge mechanism 620 provides a candy bar form factor in a cell phone application with the non-rigid support structure 610 in the folded position. A window 630 opening to one side of the enclosed flexible display screen for viewing cell phone functions and affecting touch screen commands is provided. The flexible display device is a single screen mechanism that has no seams or creases and is dual sided. The side of the display screen visible through the window 630 is the side opposite to that used in the PDA application. The viewable area of the flexible display screen viewable through the window 630 is held in a flat plane by the non-rigid support mechanism. The flexible display is coupled to the hinge mechanism along a center line axis 640 extending the full length of the display device and dividing the display device into two equal area rectangles.

FIG. 7 illustrates the non-rigid support mechanism in the unfolded position 700. The double hinge mechanism 720 provides a PDA form factor in a PDA application with the non-rigid support mechanism 710 in the unfolded position. In this unfolded position, the entire viewable area of one side of the flexible display screen 730 is now available for PDA functions. The flexible display screen is a single, dual sided component, and has no loss of use because of folding, creasing or bending. The flexible display screen is coupled to the hinge mechanism along a center line axis 750 extending the full length of the display device and dividing the display device into two equal area rectangles. The viewable area of the flexible display screen is held in a flat plane by the non-rigid support mechanism. A stylus 740 for affecting touch screen commands is shown. In this configuration, the stylus can be attached to the non-rigid support mechanism at points 760 to aid in providing a suitable bend radius for the flexible display device as the non-rigid support structure is placed in the folded position.

FIG. 8 shows the non-rigid support structure in the unfolded position 800 and illustrates a coupling mechanism between the display device 810 and the display device support 820. One edge of the flexible display device that is parallel to the hinge mechanism 830 has a thickness greater than the remainder of the flexible display device. The thickened edge of the flexible display device is placed in a slot 840 formed along the adjacent edge of the display support in order to hold the flexible display in position. The opposite, parallel edge of the flexible display 850 is held in place by a slot 860 formed on the adjacent, corresponding edge of the support mechanism. The flexible display is free to move within this slot in order to prevent creasing, puckering or gathering of the flexible display as the non-rigid support mechanism is moved between the folded and the unfolded positions.

The present invention thus provides the mechanisms for incorporating cell phone operations and PDA operations in a single non-rigid support structure by making use of a single flexible, dual sided display device wherein the support structure can be folded to a candy bar form factor when using the cell phone functions and can be unfolded to a PDA form factor when using the PDA functions.

The preferred embodiment of the present invention, a non-rigid mounting of a flexible display, is thus described. While the present invention has been described in particular embodiments, it should be appreciated that the present invention should not be construed as limited by such embodiments, but rather construed according to the below claims.

What is claimed is:

1. A non-rigid mounting of a foldable display screen comprising:
   a supporting structure having at least one hinge mechanism;
   said supporting structure foldable about said hinge mechanism between a folded and an unfolded position; and
   said foldable display screen coupled to said supporting structure, said foldable display screen coupled to said hinge mechanism, wherein said foldable display screen is foldable into both said folded and said unfolded positions.

2. A non-rigid mounting of a foldable display screen according to claim 1 wherein said display screen is dual sided for displaying information on both sides of said display screen.

3. A non-rigid mounting of a foldable display screen according to claim 1 wherein said hinge mechanism provides for folding said display screen with a bend radius that eliminates any crease, fold or bend of said display screen in both said folded and said unfolded positions.

4. A non-rigid mounting of a foldable display screen according to claim 1 wherein a viewable area of said display screen is held in a flat plane by said supporting structure in both said folded and said unfolded positions.

5. A non-rigid mounting of a foldable display screen according to claim 1 wherein said display screen has a candy bar form factor in said folded position and a Personal Digital Assistant (PDA) form factor in said unfolded position.

6. A foldable display comprising:
   a flexible display screen;
   a hinged support mechanism comprising at least one hinge mechanism;
   means for coupling said flexible display screen and said hinge mechanism; and
   means for coupling said flexible display screen and said hinged support mechanism, wherein
      moving said hinged support mechanism from an unfolded position to a folded position results in folding said flexible display screen in half.

7. A foldable display according to claim 6 wherein said display screen is dual sided for displaying information on both sides of said display screen.

8. A foldable display according to claim 6 wherein said hinged support mechanism provides for folding said display screen with a bend radius that eliminates any crease, fold or bend of said display screen in both said folded and said unfolded positions.

9. A foldable display according to claim 6 wherein said display screen is coupled along the length of said hinged support mechanism.

10. A foldable display according to claim 6 wherein said display screen has a candy bar form factor in said folded position and a Personal Digital Assistant (PDA) form factor in said unfolded position.

11. An electronic device comprising:
    a flexible display screen;
    a supporting structure for supporting said flexible display screen on a first side and along two edges of said flexible display screen; and
    a hinge mechanism disposed along a center axis of said supporting structure allowing said supporting structure to fold about its center axis between an open state and a closed state, said hinge mechanism attached to a central axis of said first side of said flexible display screen and wherein said flexible display screens folds in like fashion with said supporting structure.

12. An electronic device as described in claim 11 and wherein said flexible display screen is a double sided display screen.

13. An electronic device as described in claim 12 wherein said flexible display screen is of e-ink technology.

14. An electronic device as described in claim 11 wherein said supporting structure supports said two edges of said flexible display screen using a non-rigid supporting mechanism.

15. An electronic device as described in claim 14 wherein said non-rigid supporting mechanism comprises a separate rail for each of said two edges of said flexible display screen allowing said edges freedom of movement between said closed and said open state while holding said flexible display screen substantially flat.

16. An electronic device as described in claim 11 wherein said hinge structure provides a folding radius for said flexible display screen such that said flexible display screen does not crease in said folded state.

17. An electronic device as described in claim 11 wherein said electronic device has a candy bar form factor when in said closed state.

18. An electronic device as described in claim 11 wherein said electronic device has a personal digital assistant (PDA) form factor when in said open state.

19. An electronic device as described in claim 11 wherein said flexible display screen is a single contiguous display element without display screen separations along its central axis.

20. A method of coupling a flexible display screen and a non-rigid structure said method comprising:
    coupling said flexible display screen to said non-rigid structure having a folded position and an unfolded position, said non-rigid structure comprising at least one hinge mechanism; and
    coupling said flexible display screen to said hinge mechanism, wherein moving said hinge mechanism from said unfolded position to said folded position results in folding said flexible display device in half.

21. A method of coupling a flexible display screen and a non-rigid structure according to claim 20 wherein said non-rigid structure further includes flexible folding structure providing means for said folded and said unfolded positions.

22. A method of coupling a flexible display screen and a non-rigid structure according to claim 20 wherein said flexible display screen is dual sided for displaying information on both sides of said flexible display screen.

23. A method of coupling a flexible display screen and a non-rigid structure according to claim 20 wherein said flexible display screen has a candy bar form factor in said folded position.

24. A method of coupling a flexible display screen and a non-rigid structure according to claim 20 wherein said flexible display screen has a Personal Digital Assistant (PDA) form factor in said unfolded position.

* * * * *